(12) United States Patent
Chapman et al.

(10) Patent No.: US 10,356,360 B2
(45) Date of Patent: Jul. 16, 2019

(54) HIGH BANDWIDTH VIDEO PUSH-CABLES FOR PIPE INSPECTION SYSTEMS

(71) Applicants: Eric M. Chapman, Santee, CA (US); Mark S. Olsson, La Jolla, CA (US)

(72) Inventors: Eric M. Chapman, Santee, CA (US); Mark S. Olsson, La Jolla, CA (US)

(73) Assignee: SEESCAN, INC., San Diego, CA (US)

(*) Notice: Subject to any disclaimer, the term of this patent is extended or adjusted under 35 U.S.C. 154(b) by 0 days.

(21) Appl. No.: 15/264,355

(22) Filed: Sep. 13, 2016

(65) Prior Publication Data

US 2017/0134693 A1 May 11, 2017

Related U.S. Application Data

(63) Continuation of application No. 13/874,879, filed on May 1, 2013, now Pat. No. 9,448,376.

(60) Provisional application No. 61/780,159, filed on Mar. 13, 2013, provisional application No. 61/641,254, filed on May 1, 2012.

(51) Int. Cl.
| | |
|---|---|
| *H04N 7/10* | (2006.01) |
| *G02B 6/44* | (2006.01) |
| *H04N 7/22* | (2006.01) |
| *H01B 11/04* | (2006.01) |
| *H01B 11/18* | (2006.01) |
| *H01B 11/22* | (2006.01) |
| *H01B 7/18* | (2006.01) |
| *H01B 11/02* | (2006.01) |
| *G02B 6/54* | (2006.01) |

(52) U.S. Cl.
CPC ............ *H04N 7/10* (2013.01); *G02B 6/4416* (2013.01); *G02B 6/4434* (2013.01); *G02B 6/4463* (2013.01); *H01B 7/182* (2013.01); *H01B 11/04* (2013.01); *H01B 11/1895* (2013.01); *H01B 11/22* (2013.01); *H04N 7/22* (2013.01); *G02B 6/54* (2013.01); *H01B 11/02* (2013.01); *H01B 11/1878* (2013.01)

(58) Field of Classification Search
CPC ........ H04N 7/10; H04N 7/22; H01B 11/1895; H01B 11/22; H01B 11/04; G02B 6/4416; G02B 6/4463
See application file for complete search history.

(56) References Cited

U.S. PATENT DOCUMENTS

| | | | |
|---|---|---|---|
| 5,457,288 A | 10/1995 | Olsson et al. | |
| 5,519,173 A * | 5/1996 | Newmoyer | H01B 7/1895 156/51 |
| 5,808,239 A | 9/1998 | Olsson et al. | |
| 8,289,385 B2 | 10/2012 | Olsson et al. | |

(Continued)

FOREIGN PATENT DOCUMENTS

GB 2342419 4/2000

OTHER PUBLICATIONS

International Searching Authority, "Written Opinion of the International Searching Authority" for PCT Patent Application No. PCT/US2013/039141, dated Nov. 1, 2014, European Patent Office, Munich.

*Primary Examiner* — Ryan A Lepisto
(74) *Attorney, Agent, or Firm* — Steven C. Tietsworth, Esq.; Heena Sharma

(57) ABSTRACT

High bandwidth push-cables for high speed image or video data transmission between a camera head and a cable reel or camera control unit (CCU) are disclosed.

14 Claims, 9 Drawing Sheets

(56) References Cited

U.S. PATENT DOCUMENTS

| | | |
|---|---|---|
| 8,540,429 B1 | 9/2013 | Olsson et al. |
| 2002/0071644 A1* | 6/2002 | Nakajima ............ G02B 6/4416 385/101 |
| 2003/0021557 A1* | 1/2003 | Eichelberger .......... A61B 1/313 385/101 |
| 2003/0081917 A1* | 5/2003 | Bussear ................ E21B 47/123 385/101 |
| 2007/0151746 A1* | 7/2007 | Glew .................... G02B 6/4459 174/113 C |
| 2010/0208055 A1* | 8/2010 | Olsson ................... H01B 7/182 348/84 |

* cited by examiner

HIGH BANDWIDTH VIDEO PUSH-CABLES FOR PIPE INSPECTION SYSTEMS

CROSS-REFERENCE TO RELATED APPLICATIONS

This disclosure is a continuation of and claims priority to co-pending U.S. utility patent application Ser. No. 13/874,879, entitled HIGH BANDWIDTH PUSH-CABLES FOR VIDEO PIPE INSPECTION SYSTEMS, filed May 1, 2013, which claims priority under 35 U.S.C. § 119(e) to U.S. Provisional Patent Application Ser. No. 61/780,159, entitled HIGH BANDWIDTH PUSH-CABLES FOR VIDEO PIPE INSPECTION SYSTEMS, filed Mar. 13, 2013, and to U.S. Provisional Patent Application Ser. No. 61/641,254, entitled HIGH BANDWIDTH PUSH-CABLES FOR VIDEO PIPE INSPECTION SYSTEMS, filed May 1, 2012. The content of each of these applications is incorporated by reference herein in its entirety for all purposes.

FIELD

This disclosure relates generally to video inspection systems for inspecting the interior of pipes and other conduits or voids. More specifically, but not exclusively, this disclosure relates to high bandwidth push-cables for sending digital images or video from a camera head to a cable reel or camera control unit.

BACKGROUND

Devices and methods for visualizing the interior of pipes or other cavities are known in the art. For example, video pipe inspection systems typically include a video camera head at the end of a cable that is manually forced down the pipe to display the pipe interior on a video display. The inspection is commonly recorded using a video recorder (VCR) or digital video recorder (DVR).

Conventional video pipe inspection systems have included a semi-rigid push-cable that provides an electro-mechanical connection between a rugged camera head that houses the video camera, and a rotatable push reel used to pay out cable and force the camera head down the pipe. Existing push-cables used for such inspections are often helically wrapped with filler rods and conductors wound around a semi-rigid central push-rod. The central push-rod is typically a high-strength rod of composite material, such as fiberglass, which provides the stiffness necessary to push the cable a considerable distance, yet flexible enough to allow sharp turns in pipes and other conduits or voids.

However, current video push-cable constructions utilize a miniature seventy-five ohm impedance coaxial cable to carry the video signal, which must be handled carefully to avoid breakage, and tends to have high losses and reduced signal strength of the transmitted video signal over lengths greater than one hundred feet. A reduction in video signal strength results in a loss of fine detail or resolution as well as image contrast in the displayed video.

Accordingly, there is a need in the art to address the above-described as well as other problems.

SUMMARY

The present disclosure relates generally to systems, methods, and apparatus used in pipe inspection. More specifically, but not exclusively, the disclosure relates to high bandwidth push-cables used in video pipe inspection.

In one aspect, the present disclosure relates to a high bandwidth push-cable configured for high speed data communication, such as that used in computer networking, between a camera head and a cable reel.

In another aspect, the disclosure relates to, for example, an Ethernet push-cable having a central rod suitable for forcing a camera head through pipes, conduits, and other voids. The central rod may be composed of composite material, such as fiberglass or other similar materials. A plurality of monofilaments and unshielded twisted pairs (UTP) may be longitudinally disposed, and helically wound, around the central rod for data transmission.

In another aspect, the disclosure relates to, for example, a coaxial push-cable having a plurality of rods disposed around a coaxial cable suitable for forcing a camera head through pipes, conduits, and other voids. The rods may be composed of composite material, such as fiberglass or other similar materials. Kevlar or Aramid fiber may be substituted for glass fiber in the construction of the fiberglass rods. A coaxial cable element may be disposed centrally in coaxial push-cable for providing high bandwidth transmission of data and other information. Coaxial cable element may include one or more conductive elements and one or more insulating layers.

Various additional aspects, features, functions, and details are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

The present disclosure relates generally to apparatus for inspecting the interior of pipes and other conduits or voids. More specifically, but not exclusively, the disclosure relates to high bandwidth push-cable devices to provide high speed data communication between a camera head and a cable reel, and associated systems and methods.

In accordance with one aspect of the disclosure, an Ethernet push-cable device may include a plurality of unshielded twisted pairs (UTPs) and monofilaments and/or fiberglass rods aligned longitudinally and wrapped helically around a central rod, such as a fiberglass rod. An insulating element, such as tape, may be used to enclose and provide insulation for conductors, such as unshielded twisted pairs (UTPs) and monofilaments. A jacket element may be disposed externally to provide insulation and protection from moisture or other harmful elements.

In another aspect, the disclosure relates to, for example, a coaxial push-cable having a plurality of rods disposed around a coaxial cable suitable for forcing a camera head through pipes, conduits, and other voids. The rods may be composed of composite material, such as fiberglass or other similar materials. Kevlar or Aramid fiber may be substituted for glass fiber in the construction of the fiberglass rods. A coaxial cable element may be disposed centrally in coaxial push-cable for providing high bandwidth transmission of data and other information. Coaxial cable element may include one or more conductive elements and one or more insulating layers.

The term "exemplary" is used herein to mean "serving as an example, instance, or illustration." Any aspect and/or embodiment described herein as "exemplary" is not necessarily to be construed as preferred or advantageous over other aspects and/or embodiments.

Example Video Pipe Inspection Systems

Figure 1:
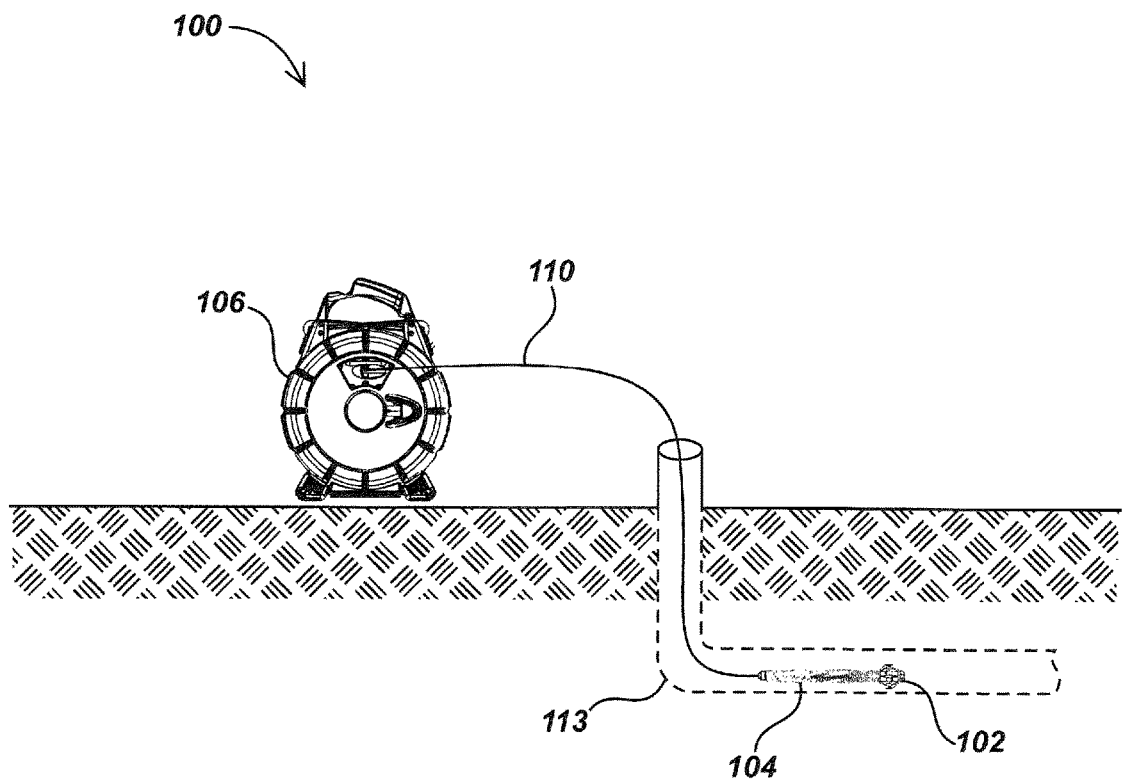
FIG. 1 illustrates details of an embodiment of a pipe inspection system configured with a high bandwidth push-cable, in accordance with aspects of the present disclosure.

Referring to FIG. 1, an exemplary embodiment of a pipe inspection system 100 is illustrated in accordance with aspects of the present disclosure. In one aspect, pipe inspection system 100 may include a camera head 102 coupled to the end of a high bandwidth push-cable 110, which may be payed out and retrieved from a drum reel 106 by a user, either manually or automatically. High bandwidth push-cable 110 may provide an electromechanical connection between the camera head 102 and drum reel 106 used to force a camera head 102 down the length of a pipe 113. In one aspect, an elongated coil spring 104 may be disposed around a segment of high bandwidth push-cable 110 for protection and rigidity.

One or more elements, such as a wireless transceiver module (not shown) may be disposed within the pipe inspection system, such as for example, inside drum reel 106, for transmitting and receiving signals via wireless technology, such as WIFI, MILAN or Bluetooth. Wireless HDMI may also be used.

Video compression may be carried out within the pipe inspection system, such as, for example, in the rotating portion of the drum reel 106.

Figure 2:
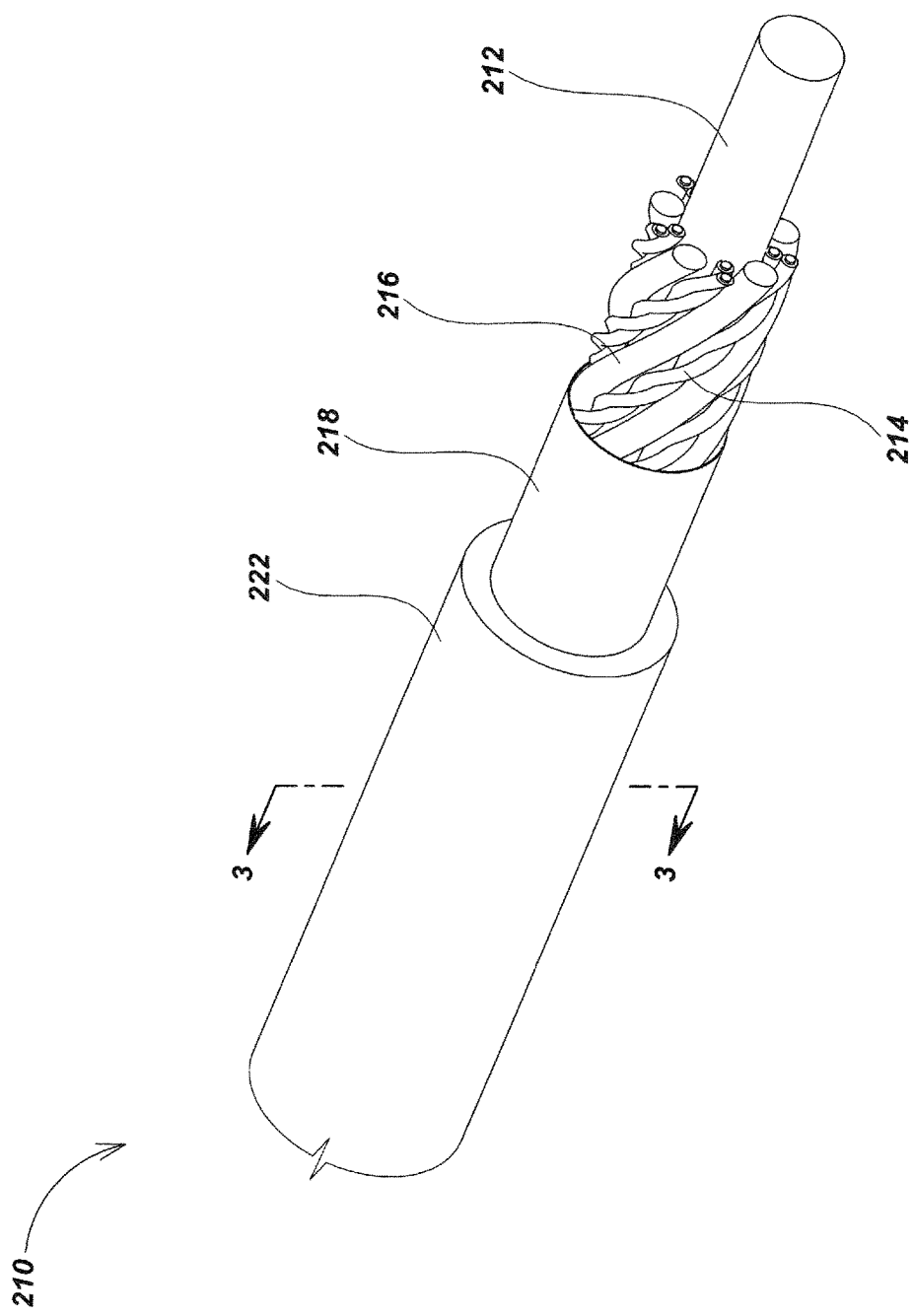
FIG. 2 is an enlarged fragmentary isometric view of an embodiment of an Ethernet push-cable, illustrating details thereof.

FIG. 2 is an enlarged fragmentary isometric view of an embodiment of an Ethernet push-cable 210, illustrating details thereof. Ethernet push-cable 210 may correspond with high bandwidth push-cable 110 (as shown in FIG. 1). In an exemplary embodiment, push-cable 210 may include one or more push rods 212, which may be made of fiberglass or other resilient composite materials and may be disposed centrally in Ethernet push-cable 210 to provide flexible strength to the push-cable. In an exemplary embodiment, a push-cable may include a single push rod 212 as shown; however, in other embodiments two or more push rods may be used.

Ethernet push-cable 210 may also include various mechanical elements and conductors, such as a plurality of conductive wires, such as unshielded twisted pairs (UTP) 214, which may be helically wrapped around central push rod 212, to provide data transmission. In addition, a plurality of non-conductive elements or spacers, such as monofilaments 216, may be dispersed between UTPs 214. Monofilaments 216 may be made of one more or materials, such as fiberglass, carbon fiber, braided metals, and/or other materials to provide stiffness and strength along the push-cable 210. One or more of the monofilaments 216 may optionally be replaced with fiber optic cables or other wires or cables.

UTPs 214 may include four or more twisted pairs of wires with various twist rates, which may be commonly referred to as "pitch" of the twists, such as 65.2 turns/m (green), 64.8 turns/m (blue), 56.2 turns/m (orange), and 51.7 turns/m (brown). By varying the pitch, crosstalk may be reduced without affecting the characteristic impedance.

A layer of film or adhesive material, such as a tape 218, such as Neptape® or other mechanical binding elements, may be used to bind UTPs 214 and monofilaments 216 longitudinally disposed along central push rod 212. An outer insulating jacket 222, which may be made of extruded polyamide or other insulating materials, may be disposed on the external surface of push-cable 210 to provide insulation and protection against moisture or other environmental elements or contaminants. Shielding tape may be disposed underneath jacket 222 and may utilize copper or aluminum foil or tape.

Figure 3:
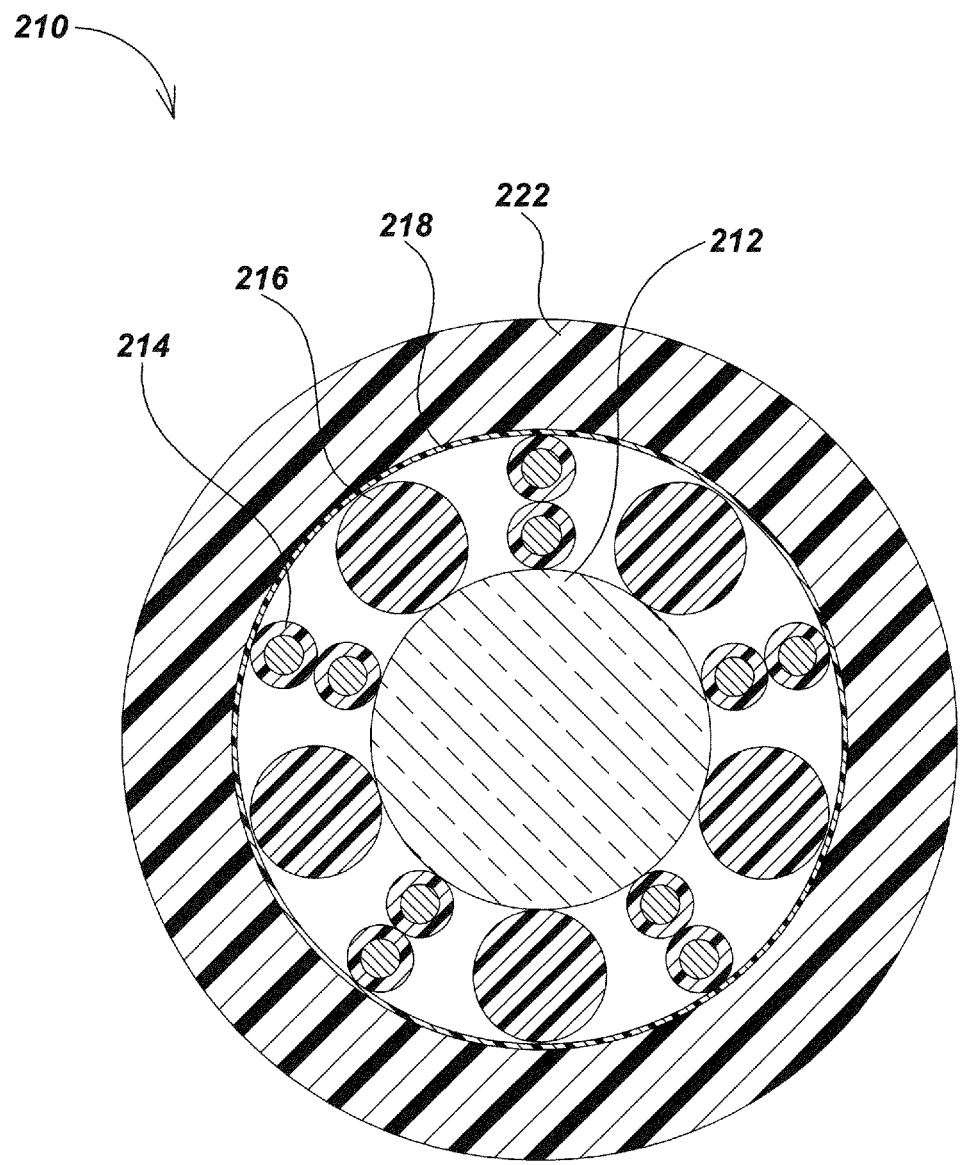
FIG. 3 is a cross-section view of the Ethernet push-cable embodiment, taken along line 3-3 of FIG. 2.

FIG. 3 is a cross-section view of the Ethernet push-cable embodiment 210, taken along line 3-3 of FIG. 2. Spacers, such as monofilaments 216, may be alternated and distributed longitudinally around central push rod 212 and enclosed within tape 218.

Other elements may be included in push-cable 210, such as, for example, polytetraflouroethylene (TFE) tape or similar or equivalent materials, which may optionally be used to wrap central push rod 212 and/or wrap (individually) one or more UTPs 214.

Figure 4:
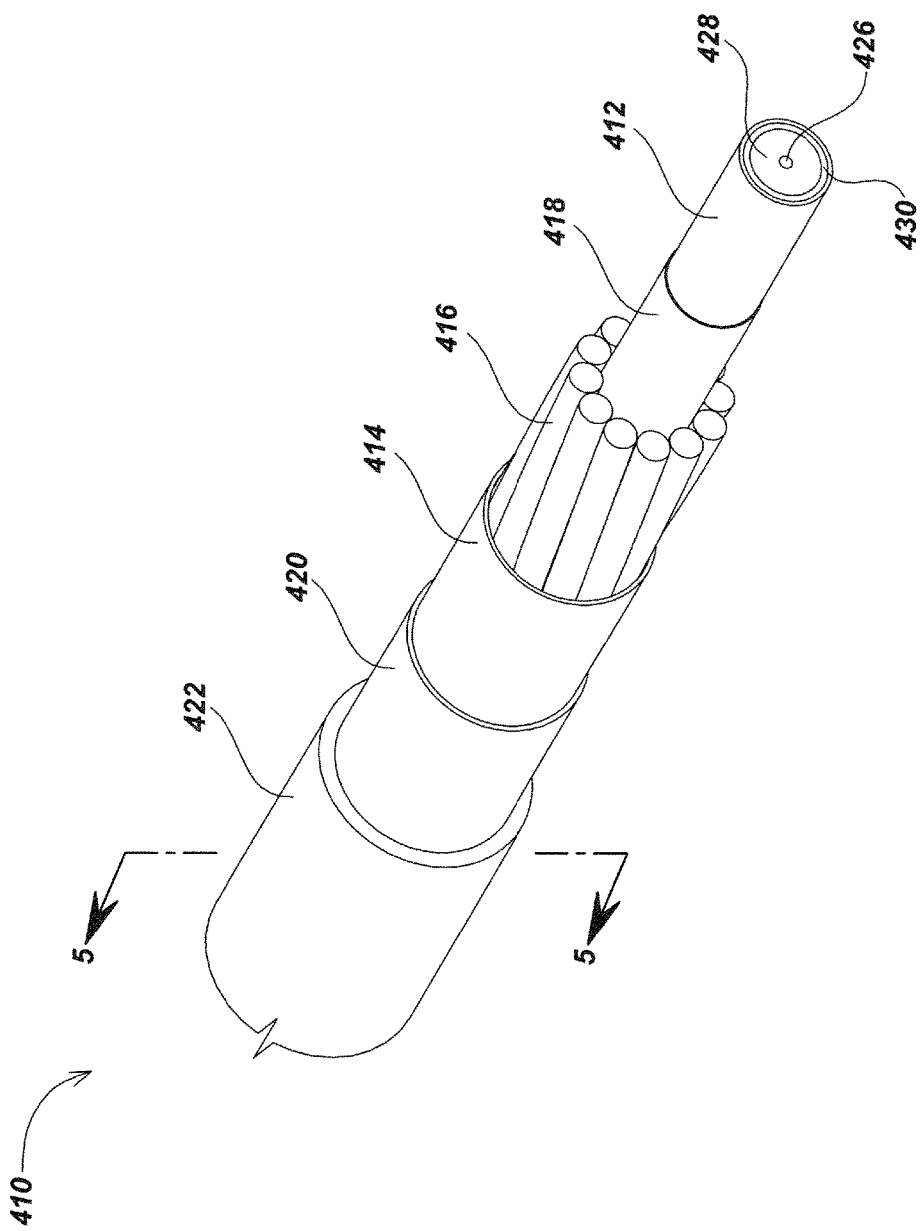
FIG. 4 is an enlarged fragmentary isometric view of an embodiment of a coaxial push-cable, illustrating details thereof.

FIG. 4 is an enlarged fragmentary isometric view of an alternate high bandwidth push-cable embodiment, such as a Coaxial push cable 410, illustrating details thereof. Coaxial push-cable 410 may correspond with high bandwidth push-cable 110 of FIG. 1. In an exemplary embodiment, a coaxial core cable element 412 may be disposed centrally in coaxial push-cable 410 for providing high bandwidth transmission of data and other information.

Coaxial cable element 412 may include one or more conductive elements, such as an inner conductor 426, which may be made of strand and/or solid copper, or silver plated copper, or copper-plated iron or steel wire, or other similar materials, and one or more insulating layers, such as a dielectric insulating core 428, which may be made of solid or foam plastic, such as solid polyethylene (PE), solid Teflon (PTFE), polyethylene foam, or other similar materials. A coax shield 430, which may be, for example, a copper braid, a silver plated copper braid, copper foil tape, or other shielding material(s) may optionally be disposed around dielectric insulating core 428. Air with spacers may optionally be used to support the inner wire. A layer of tape 418 may optionally be disposed around coaxial cable element 412 for friction modification and/or diameter adjustment.

Push-cable 410 may include a plurality of rods 416 which may be helically wrapped around coax 412. Rods 416 may be made of fiberglass or other composite material to provide flexible strength to the push cable 410. A binding wrap 414 may be used for binding fiberglass rods 416. A conductive element, such as a spectra braid 420 or other conductive material, may optionally be disposed around the outer surface of binding wrap 414 to carry electrical signals within push-cable 410. An outer insulating jacket 422, which may be made of extruded polyamide or the like, may be disposed on the external surface of push-cable 410 to provide insulation and protection against moisture and other elements. Outer insulating jacket 422 may correspond with jacket 222 (FIG. 2).

Figure 5:
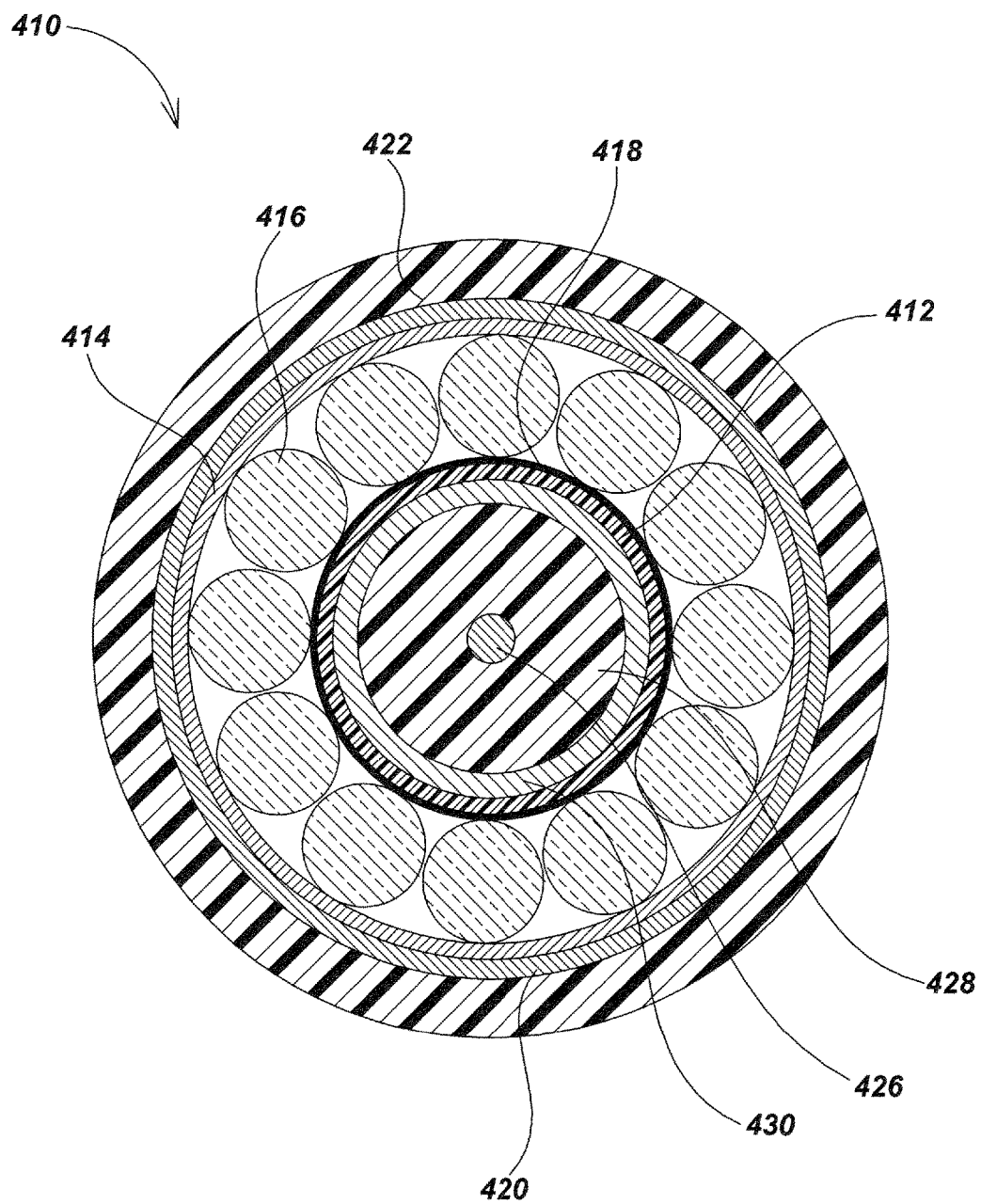
FIG. 5 is a cross-section view of the coaxial push-cable embodiment, taken along line 5-5 of FIG. 4.

FIG. 5 is a cross-section view of the coaxial push-cable embodiment 410, taken along line 5-5 of FIG. 4. In an exemplary embodiment, coaxial cable element 412 may include one or more elements, such as inner conductor 426 embedded within dielectric insulating core 428. Various elements, such as tape 418, fiberglass rods 416, binding wrap 414, and outer insulating jacket 422 may be disposed around coaxial cable element 412. Push cable 410 may optionally include spectra braid 420 and coax shield 430.

Figure 6:
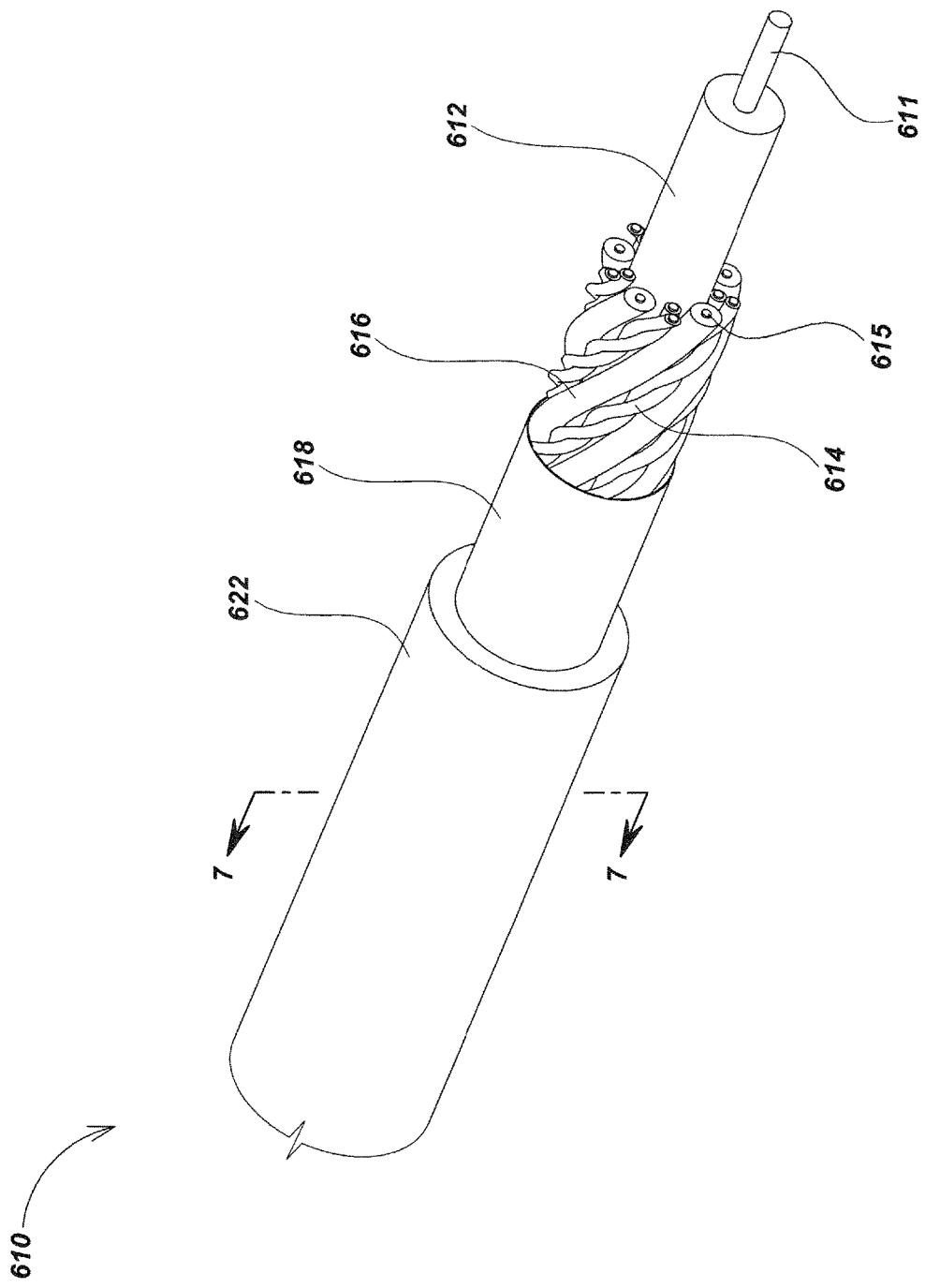
FIG. 6 is an enlarged fragmentary isometric view of an embodiment of an Ethernet push-cable, illustrating details thereof.

FIG. 6 is an enlarged fragmentary isometric view of an embodiment of an Ethernet push-cable 610, illustrating details thereof. Ethernet push-cable 610 may correspond with high bandwidth push-cable 110 (as shown in FIG. 1). In an exemplary embodiment, push-cable 610 may include one or more push rods 612, which may be made of fiberglass or other resilient composite materials and may be disposed centrally in Ethernet push-cable 610 to provide flexible strength to the push-cable. In an exemplary embodiment, a push-cable may include a single push rod 612 as shown; however, in other embodiments two or more push rods may be used.

Ethernet push-cable 610 may also include various mechanical elements and conductors, such as a plurality of conductive wires, such as unshielded twisted pairs (UTP) 614, which may be helically wrapped around central push rod 612, to provide data transmission. In addition, a plurality of non-conductive elements or spacers, such as monofilaments 616, may be dispersed between UTPs 614. Monofilaments 616 may be made of one more or materials, such as fiberglass, carbon fiber, braided metals, and/or other materials to provide stiffness and strength along the push-cable 610. An optical fiber, such as optical fiber 611 may optionally be disposed through the center of central push rod 612. One or more of the monofilaments 616 may optionally be replaced with fiber optic cables or other wires or cables. An optional optical fiber, such as optical fiber 615 may be disposed within the center of monofilaments 616.

UTPs 614 may include four or more twisted pairs of wires with various twist rates, which may be commonly referred to as "pitch" of the twists, such as 65.2 turns/m (green), 64.8 turns/m (blue), 56.2 turns/m (orange), and 51.7 turns/m (brown). By varying the pitch, crosstalk may be reduced without affecting the characteristic impedance.

A layer of film or adhesive material, such as a tape 618, such as Neptape® or other mechanical binding elements, may be used to bind UTPs 614 and monofilaments 616 longitudinally disposed along central push rod 612. An outer insulating jacket 622, which may be made of extruded polyamide or other insulating materials, may be disposed on the external surface of push-cable 610 to provide insulation and protection against moisture or other environmental elements or contaminants. Shielding tape may be disposed underneath jacket 622 and may utilize copper or aluminum foil or tape.

Figure 7:
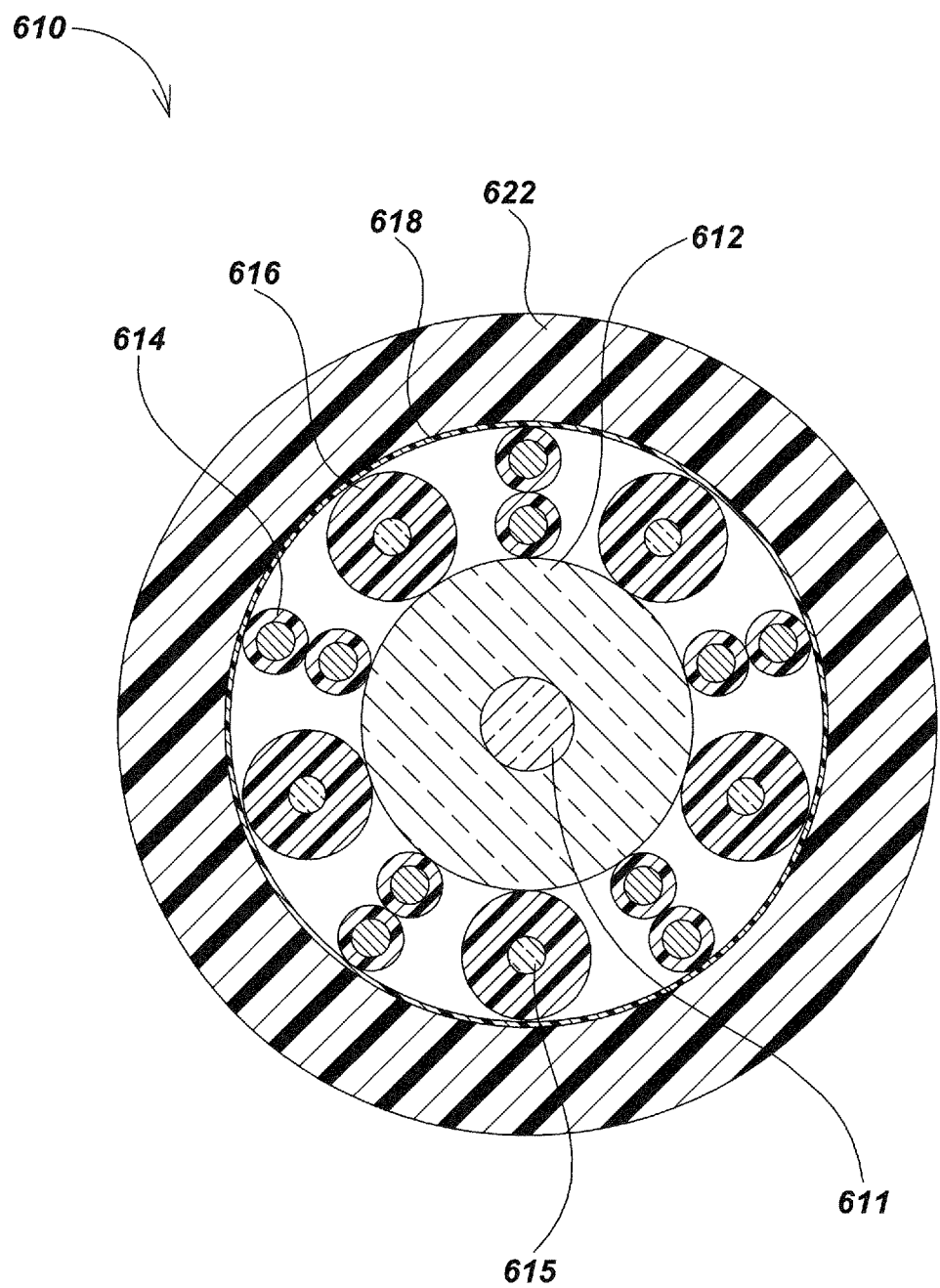
FIG. 7 is a cross-section view of the Ethernet push-cable embodiment, taken along line 7-7 of FIG. 6.

FIG. 7 is a cross-section view of the Ethernet push-cable embodiment 610, taken along line 7-7 of FIG. 6. Spacers, such as monofilaments 616, may be alternated and distributed longitudinally around central push rod 612 and enclosed within tape 618.

Other elements may be included in push-cable 610, such as, for example, polytetraflouroethylene (TFE) tape or similar or equivalent materials, which may optionally be used to wrap central push rod 612 and/or wrap (individually) one or more UTPs 614.

An optional optical fiber, such as optical fiber 611 may be disposed through the center of central push rod 612. One or more of the monofilaments 616 may optionally be replaced with fiber optic cables or other wires or cables. For example, an optional optical fiber, such as optical fiber 615 may be disposed through the center of one or more monofilaments 616.

Figure 8:
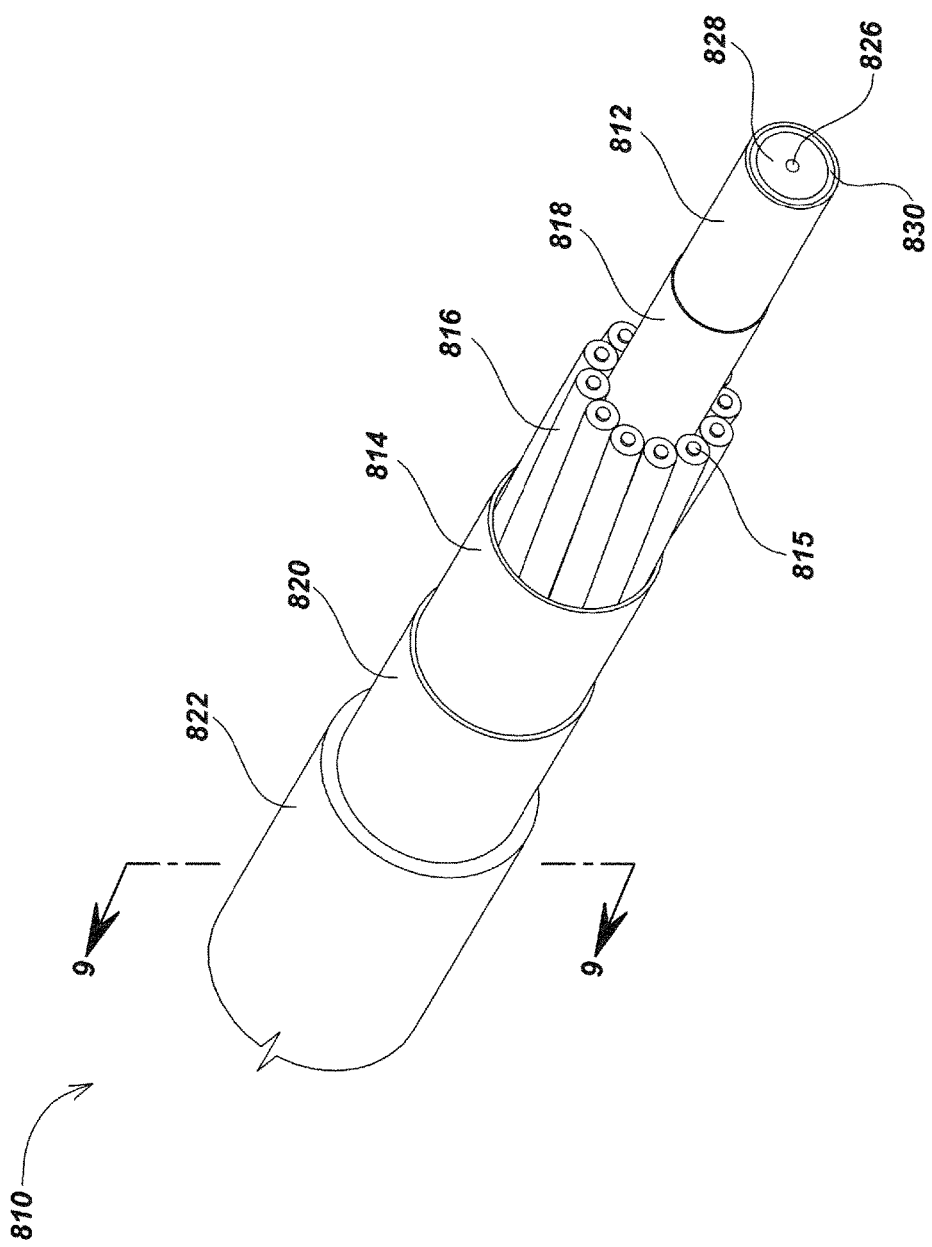
FIG. 8 is an enlarged fragmentary isometric view of an embodiment of a coaxial push-cable, illustrating details thereof.

FIG. 8 is an enlarged fragmentary isometric view of an alternate high bandwidth push-cable embodiment, such as a Coaxial push cable 810, illustrating details thereof. Coaxial push-cable 810 may correspond with high bandwidth push-cable 110 of FIG. 1. In an exemplary embodiment, a coaxial core cable element 812 may be disposed centrally in coaxial push-cable 810 for providing high bandwidth transmission of data and other information.

Coaxial cable element 812 may include one or more conductive elements, such as an inner conductor 826, which may be made of strand and/or solid copper, or silver plated copper, or copper-plated iron or steel wire, or other similar materials, and one or more insulating layers, such as a dielectric insulating core 828, which may be made of solid or foam plastic, such as solid polyethylene (PE), solid Teflon (PTFE), polyethylene foam, or other similar materials. A coax shield 830, which may be, for example, a copper braid, a silver plated copper braid, copper foil tape, or other shielding material(s) may optionally be disposed around dielectric insulating core 828. Air with spacers may optionally be used to support the inner wire. A layer of tape 818 may optionally be disposed around coaxial cable element 812 for friction modification and/or diameter adjustment.

Push-cable 810 may include a plurality of rods 816 which may be helically wrapped around coax 812. Rods 816 may be made of fiberglass or other composite material to provide flexible strength to the push cable 810. A binding wrap 814 may be used for binding fiberglass rods 816. An optional optical fiber, such as optical fiber 815 may be disposed within one or more fiberglass rods 816. A conductive element, such as a spectra braid 820 or other conductive material, may optionally be disposed around the outer surface of binding wrap 814 to carry electrical signals within push-cable 810. An outer insulating jacket 822, which may be made of extruded polyamide or the like, may be disposed on the external surface of push-cable 810 to provide insulation and protection against moisture and other elements. Outer insulating jacket 822 may correspond with jacket 222 (FIG. 2) and jacket 422 (FIG. 4).

Figure 9:
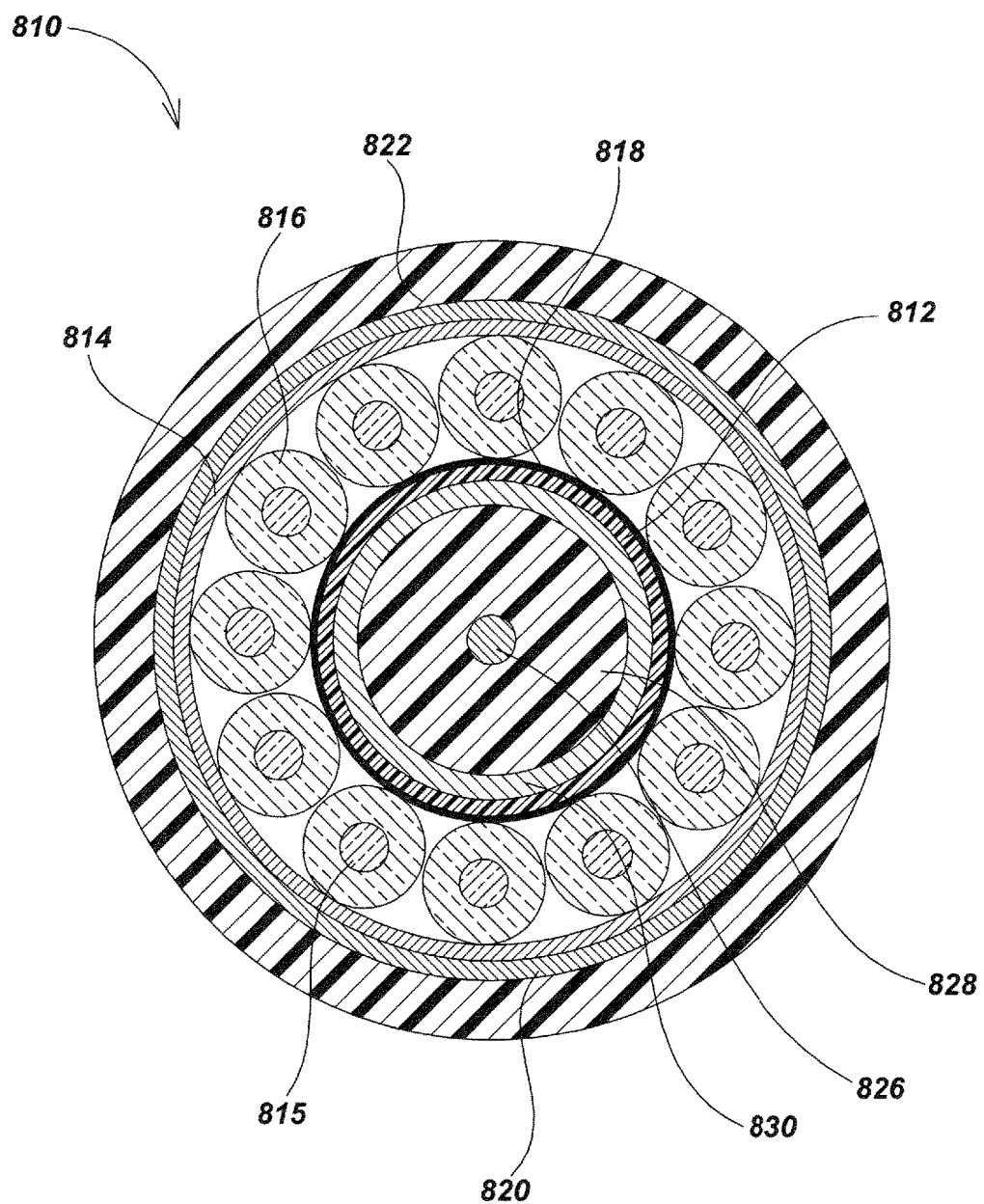
FIG. 9 is a cross-section view of the coaxial push-cable embodiment, taken along line 9-9 of FIG. 8.

FIG. 9 is a cross-section view of the coaxial push-cable embodiment 810, taken along line 9-9 of FIG. 8. In an exemplary embodiment, coaxial cable element 812 may include one or more elements, such as inner conductor 826 embedded within dielectric insulating core 828. Various elements, such as tape 818, fiberglass rods 816, binding wrap 814, and outer insulating jacket 822 may be disposed around coaxial cable element 812. An optional optical fiber, such as optical fiber 815 may be disposed centrally through one or more fiberglass rods 816. Push cable 810 may optionally include spectra braid 820 and coax shield 830.

Other embodiments may include combinations of coaxial and twisted pair conductors in conjunction with alternate push-cable system configurations. For example, push-cable and video push cable system configurations as described in, for example, the following incorporated United States Patents and Patent applications may be used in conjunction with the disclosure herein in various embodiments. The incorporated patents and patent applications include co-assigned U.S. Pat. No. 6,958,767, entitled VIDEO PIPE INSPECTION SYSTEM EMPLOYING NON-ROTATING CABLE STORAGE DRUM, issued Oct. 25, 2005, U.S. Pat. No. 6,862,945, entitled CAMERA GUIDE FOR VIDEO PIPE INSPECTION SYSTEM, issued Mar. 8, 2005, U.S. Pat. No. 6,545,704, entitled VIDEO PIPE INSPECTION DISTANCE MEASURING SYSTEM, issued Apr. 8, 2003, U.S. Pat. No. 5,939,679, entitled VIDEO PUSH-CABLE, issued Aug. 17, 1999, U.S. Pat. No. 5,808,239, entitled VIDEO PUSH-CABLE, issued Sep. 15, 1998, U.S. Pat. No. 5,457,288, entitled DUAL PUSH-CABLE FOR PIPE INSPECTION, issued Oct. 10, 1995, U.S. patent application Ser. No. 13/346,668, entitled PORTABLE CAMERA CONTROLLER PLATFORM FOR USE WITH PIPE INSPECTION SYSTEM, filed Jan. 1, 2012, U.S. Provisional Patent Application Ser. No. 61/559,107, entitled PORTABLE PIPE INSPECTION SYSTEMS & APPARATUS, filed Nov. 13, 2011, U.S. patent application Ser. No. 13/214,208, entitled ASYMMETRIC DRAG FORCE BEARINGS FOR USE WITH PUSH-CABLE, filed Aug. 21, 2011, U.S. patent application Ser. No. 13/073,919, entitled PIPE INSPECTION SYSTEM WITH JETTER PUSH-CABLE, filed Mar. 16, 2011, U.S. patent application Ser. No. 12/766,742, entitled PIPE INSPECTION CABLE COUNTER AND OVERLAY MANAGEMENT SYSTEM, filed Apr. 23, 2010, U.S. patent application Ser. No. 12/658,939, entitled SNAP ON PIPE GUIDE, filed Feb. 16, 2010, U.S. patent application Ser. No. 12/704,808, entitled PIPE INSPECTION SYSTEM WITH REPLACEABLE CABLE STORAGE DRUM, filed Feb. 12, 2010, U.S. patent application Ser. No. 12/399,859, entitled PIPE INSPECTION SYSTEM WITH SELECTIVE IMAGE CAPTURE, filed Mar. 6, 2009, U.S. patent application Ser. No. 12/371,540, entitled PUSH-CABLES FOR PIPE INSPECTION SYSTEM, filed Feb. 13, 2009, U.S. patent application Ser. No. 11/928,818, entitled PIPE MAPPING SYSTEM, filed Oct. 30, 2007, U.S. patent application Ser. No. 11/774,462, filed Jul. 6, 2007, U.S. patent application Ser. No. 11/679,092, entitled LIGHT WEIGHT SEWER CABLE, filed Feb. 26, 2007. The content of each of these applications is incorporated by reference herein in its entirety.

Other combinations of the various aspects, elements, components, features, and/or functions described previously herein may be combined in various configurations. In addition, details regarding additional aspects, elements, components, features, functions, apparatus, and/or methods which may be used in conjunction with the embodiments described previously herein in various implementations are described in the co-assigned incorporated applications of the assignee of the instant application.

In one or more exemplary embodiments, the various data collection, measurement, storage and signal processing functions, video conversion, transmission, and processing methods and processes described herein and/or in the related applications may be implemented in hardware, software, firmware, or any combination thereof. If implemented in software, the functions may be stored on or encoded as one or more instructions or code on a computer-readable medium. Computer-readable media include computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. Any accompanying process or method claims present elements of the various steps in a sample order, however, this is not meant to be limiting unless specifically noted.

Those of skill in the art would understand that information and signals, such as analog or video signals, data signals, audio signals, or other information signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. In some embodiments mechanical elements and functions, such as ground follower assemblies, yoke assemblies, or other mechanical elements may be replaced, in whole or in part, by other elements, such as acoustic or optical elements. For example, in some embodiments, some or all of the mechanical elements of a ground follower assembly as described previously herein may include acoustic and/or optical ground movement detection elements in place of or in addition to mechanical elements such as wheels and yokes.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the presently claimed invention is not intended to be limited to the aspects shown and described previously herein, but should be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the appended claims and their equivalents.

We claim:

1. A high bandwidth Ethernet video push cable for use in a pipe inspection system, comprising:
   an elongate fiberglass push rod positioned at the center of the push cable;
   a first connector apparatus at one end of the push cable for mechanically and electrically coupling a pipe inspection camera head;
   an Ethernet cable circuit comprising a layer positioned around the fiberglass push rod, the layer including:
   a plurality of twisted pairs, each of two conductive wires, wrapped helically around the push rod; and
   a plurality of non-conductive elongate circular cross-section monofilaments, with each monofilament positioned between two of the twisted pairs in the layer, wherein the layer thickness is substantially the same as the larger of the diameter of one of the twisted pairs or the diameter of the monofilament; and
   a second connector apparatus at the other end of the push cable for electromechanically coupling the plurality of conductive wires to a drum reel or to a camera control unit (CCU).

2. The video push cable of claim 1, wherein the plurality of conductive wires helically wrapped around the push rod are one or more unshielded twisted pairs (UTPs).

3. The video push cable of claim 1, further comprising a layer of film or adhesive material binding the UTPs and the non-conductive elements.

4. The video push cable of claim 1, wherein the monofilaments comprise fiberglass or carbon fiber.

5. The video push cable of claim 1, wherein the monofilaments comprise a braided metal.

6. The video push cable of claim 1, further comprising one or more spacers alternated and distributed longitudinally around the push rod and enclosed within a tape.

7. The video push cable of claim 1, further comprising an outer insulating jacket comprising extruded polyamide and a layer of metallic shielding tape positioned underneath the insulating jacket.

8. The video push cable of claim 1, wherein the plurality of twisted pairs comprise four twisted pairs, with each of the twisted pairs having a different pitch than others of the twisted pairs.

9. The push cable of claim 1, further comprising one or more additional push rods disposed about the centrally positioned push rod.

10. The video push cable of claim 1, wherein the push rod comprises a carbon fiber material.

11. The video push cable of claim 10, wherein the resilient composite material comprises Kevlar or Aramid fiber.

12. The video push cable of claim 1, further including an Ethernet connector with the Ethernet cable circuit wires terminated thereto.

13. A high bandwidth Ethernet video push cable for use in a pipe inspection system, comprising:
   a push rod made of a resilient composite material disposed centrally in the push cable;
   an Ethernet cable circuit comprising a layer positioned around the fiberglass push rod, the layer including:
   a plurality of twisted pairs, each of two conductive wires, wrapped helically around the push rod; and
   a plurality of non-conductive elongate circular cross-section monofilaments, with each monofilament positioned between two of the twisted pairs in the layer, wherein the layer thickness is substantially the same as the larger of the diameter of one of the twisted pairs or the diameter of the monofilament;
   a first Ethernet connector apparatus at one end of the push cable for mechanically and electrically coupling the Ethernet cable circuit to the pipe inspection camera head; and
   a second Ethernet connector apparatus at the other end of the push cable for electromechanically coupling the Ethernet cable circuit to a drum reel or to a camera control unit (CCU).

14. The video push cable of claim 13, wherein the non-conductive elongate circular cross section monofilaments are made of fiberglass or carbon fiber material.

* * * * *